United States Patent
Salomatin et al.

(10) Patent No.: US 8,620,720 B2
(45) Date of Patent: Dec. 31, 2013

(54) EMBEDDING CALENDAR KNOWLEDGE IN EVENT-DRIVEN INVENTORY FORECASTING

(75) Inventors: Konstantin Salomatin, Pittsburgh, PA (US); Datong Chen, Santa Clara, CA (US); Qi He, Mountain View, CA (US); Peiji Chen, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 200 days.

(21) Appl. No.: 13/096,629

(22) Filed: Apr. 28, 2011

(65) Prior Publication Data
US 2012/0278129 A1 Nov. 1, 2012

(51) Int. Cl.
*G06Q 30/00* (2012.01)

(52) U.S. Cl.
USPC ........ 705/7.31; 705/7.12; 705/7.22; 705/7.29

(58) Field of Classification Search
USPC .............................. 705/7.29, 7.31, 7.12, 7.22
See application file for complete search history.

(56) References Cited

U.S. PATENT DOCUMENTS

| | | | | |
|---|---|---|---|---|
| 6,839,682 B1 * | 1/2005 | Blume et al. | ................ | 705/7.31 |
| 7,369,961 B2 * | 5/2008 | Castelli et al. | ................ | 702/176 |
| 7,865,389 B2 * | 1/2011 | Shan | ............ | 705/7.29 |
| 8,352,315 B2 * | 1/2013 | Faith et al. | ................ | 705/14.1 |
| 2006/0173668 A1 * | 8/2006 | Haigh et al. | ................ | 703/17 |
| 2007/0055477 A1 * | 3/2007 | Chickering et al. | ............ | 702/182 |

OTHER PUBLICATIONS

Eichorn et al., Prediction on Spike Data Using Kernel Algorithms, 2004, p. 1-8.*
Moore, Mathematical Modelling, Forecasting and Telemonitoring of Mood in Bipolar Disorder, 2010, p. 1-64.*
Ahmed, Tourism Demand Forecasting Using Machine Learning Methods, International Journal on Artificial Intelligence and Machine Learning (AIML), Special Issue on "Computational Methods for the Tourism Industry", 2007, p. 1-7.*
Seeger, Bayesian Gaussian Process Models: PAC-Bayesian Generalisation Error Bounds and Sparse Approximations, University of Edinburgh, 2005, p. 1-256.*

* cited by examiner

*Primary Examiner* — Justin M Pats
(74) *Attorney, Agent, or Firm* — Brinks Gilson & Lione (57) ABSTRACT

Systems and methods for automatically forecasting the future availability of one or more resources, such as Internet advertising opportunities, are described herein. In accordance with various embodiments, a forecasting model that accounts for event-driven resource availability is trained based both on historical supply data and calendar information specifying events and event duration. The trained forecasting model is then used to forecast the availability of resources at one or more specified future time periods. In accordance with certain embodiments, the forecasting model comprises a Gaussian process model that has an event-driven kernel as a covariance function.

20 Claims, 4 Drawing Sheets

EMBEDDING CALENDAR KNOWLEDGE IN EVENT-DRIVEN INVENTORY FORECASTING

BACKGROUND OF THE INVENTION

1. Field of the Invention

The present invention generally relates to systems and methods for forecasting the future availability of one or more resources, including but not limited to online display advertising opportunities.

2. Background

The Internet has emerged as a powerful advertising tool. It is commonplace to see advertisements on many Web sites. For example, advertisements may be displayed on search results pages generated by Web search engines and may be targeted to individuals based upon search terms submitted by the individuals. Other Web sites, such as news and sports Web sites, may provide space for display advertisements. Publishers of these Web sites may sell advertising space to advertisers to offset the costs associated with operating the Web sites as well as to turn a profit.

To place an advertisement, an advertiser may enter into a contract with a proprietor of an ad serving system to serve a number of advertisement impressions. An impression corresponds to the display of an advertisement to a user. For example, the advertiser may purchase 10,000 impressions for $100 and may specify a particular target audience, such as users that like sports.

When preparing to enter a contract, the advertiser (or an agent thereof) may interact with a system that allows the advertiser to specify the types of advertising opportunities in which the advertiser is interested so as to determine the availability thereof. This may involve selecting one or more target attributes from among a set of attributes and then specifying a target value for each of the target attributes. The target attributes may include, for example, attributes associated with the viewers that will view an impression (e.g., gender, age group), attributes associated with the content of the Web page on which the impression will be delivered, attributes involving the location of the impression on the Web page, a time period during which the impression will be served, and the like.

To determine the availability of future advertising opportunities that match the specified target attributes, a process sometimes referred as inventory forecasting may be used. Within the context of online display advertising, inventory forecasting generally involves using historical data regarding the actual delivery of different types of ad impressions to users to train a forecasting model which can then be used to predict when certain types of advertising opportunities will arise in the future. If a proprietor of an ad serving system can accurately forecast when advertising opportunities will arise, then the proprietor can more successfully monetize such advertising opportunities. For example, accurate inventory forecasting can enable the proprietor to guarantee the delivery of a certain volume of ad impressions to certain types of users during a particular time frame. It is therefore important to proprietors of ad serving systems to utilize an inventory forecasting model that is as accurate as possible.

In some cases, the availability of advertising opportunities is strongly shaped by particular events. For example, a Web site that publishes sports-related information (e.g., YAHOO! Sports) may experience a sudden and massive increase in online visits during the Super Bowl or other popular sporting event. If such event-driven spikes in online traffic could be accurately forecast, then a correspondingly large number of advertising opportunities could be monetized.

Since many high-traffic events are scheduled to occur at known dates and times, there would appear to be great potential to improve forecasting accuracy for event-driven inventory if calendar information could be embedded into model training and forecasting. However, there are various problems that must be solved in order to achieve this. One of the most challenging problems is that different events may exhibit a wide variety of durations and alignments. For example, the same annual event may be shifted in time by a couple of days or weeks from one year to another. Furthermore, traditional inventory forecasting frameworks lack the power to deal with calendar knowledge. Typically, calendar effects have to be removed from the historical signal before training. Another problem is that some conventional inventory forecasting frameworks utilize parametric forecasting models. However, such models do not perform well in predicting complex signals, especially when such signals are event-driven.

BRIEF SUMMARY OF THE INVENTION

Systems and methods for automatically forecasting the future availability of one or more resources, such as online display advertising opportunities, are described herein. In accordance with various embodiments, a forecasting model that accounts for event-driven resource availability is trained based both on historical supply data and calendar information specifying events and event duration. The trained forecasting model is then used to forecast the availability of resources at one or more specified future time periods. In accordance with certain embodiments, the forecasting model comprises a Gaussian process model that has an event-driven kernel as a covariance function.

Where the resources comprise online display advertising opportunities, the systems and methods described herein may advantageously be used to support a display advertisement booking system or other system configured to monetize forecasted online advertising opportunities.

In particular, a method for automatically forecasting an availability of resources, such as online display advertising opportunities, is described herein. In accordance with the method, a forecasting model is trained based both on historical supply data and calendar information. The historical supply data specifies one or more past time periods in a series of time periods and a number of resources that were available during each of the one or more past time periods. The calendar information identifies one or more events and, for each event, one or more corresponding time periods in the series of time periods during which the event occurs. The training of the forecasting model produces a trained forecasting model that accounts for event-driven resource availability. After the forecasting model is trained, a specification of one or more future time periods in the series of time periods is received. A forecasted number of resources available for each of the one or more future time periods is then generated based on the trained forecasting model.

In accordance with certain embodiments, the forecasting model comprises a non-parametric forecasting model. In still further accordance with such embodiments, the non-parametric forecasting model may comprise a Gaussian process model. To account for event-driven resource availability, the Gaussian process model may include an event-driven kernel as a covariance function. In accordance with certain embodiments, the event driven kernel may be defined as $$k(x_i, x_j) =$$
$$\sigma_f^2 \exp\left(-\frac{1}{2l^2}\|x_i - x_j\|^2 - \frac{1}{2h^2}\alpha_{e^*}(d(x_i, e^*) - d(x_j, e^*))^2\right) + \sigma_s^2 \delta_{x_i x_j}$$

where $$e^* = \underset{e \in E}{\operatorname{argmin}}\,[d(x_i, e) + d(x_j, e)],$$

wherein $x_i$ and $x_j$ comprise calendar feature vectors associated with time periods within the series of time periods, $\sigma_f^2$ comprises a signal variance, l comprises a length scaling parameter, h comprises an event scaling parameter, $\sigma_s^2$ comprises a noise variance, $\delta_{x_i x_j}$ comprises a Kronecker delta function, E comprises a list of events, d(.) is a distance function that defines a de-correlation level between a calendar feature vector and an event in the list of events, and $\alpha_{e^*} > 0$ comprises a weight associated with event e* in the list of events.

In further accordance with certain embodiments, the foregoing method may also include generating calendar features for each of the one or more past time periods specified by the historical supply data and for at least one of the one or more time periods identified for each event and training the forecasting model based also on the generated calendar features.

An inventory forecasting system is also described herein. The inventory forecasting system includes a software-implemented training module and a software-implemented forecasting module executing on one or more processor-based computer systems. The training module trains a forecasting model based both on historical supply data and calendar information. The historical supply data specifies one or more past time periods in a series of time periods and a number of resources that were available during each of the one or more past time periods. The calendar information identifies one or more events and, for each event, one or more corresponding time periods in the series of time periods during which the event occurs. The training module produces a trained forecasting model that accounts for event-driven resource availability. The forecasting module receives a specification of one or more future time periods in the series of time periods and generates a forecasted number of resources available for each of the one or more future time periods based on the trained forecasting model.

A computer program product is also described herein. The computer program product comprises a computer-readable storage medium having computer program logic recorded thereon for enabling a processing unit to forecast an availability of resources. The computer program logic comprises first computer program logic and second computer program logic. The first computer program logic is executable by the processing unit to receive a specification of one or more future time periods in a series of time periods. The second computer program logic is executable by the processing unit to generate a forecasted number of resources available for each of the one or more future time periods based on a forecasting model, wherein the forecasting model is trained based both on historical supply data and calendar information, the historical supply data specifying one or more past time periods in the series of time periods and a number of resources that were available during each of the one or more past time periods and the calendar information identifying one or more events and, for each event, one or more corresponding time periods in the series of time periods during which the event occurs.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Systems and methods for automatically forecasting the future availability of one or more resources, such as online display advertising opportunities, are described herein. In accordance with various embodiments, a forecasting model that accounts for event-driven resource availability is trained based both on historical supply data and calendar information specifying events and event duration. The trained forecasting model is then used to forecast the availability of resources at one or more specified future time periods. In accordance with certain embodiments, the forecasting model comprises a Gaussian process model that has an event-driven kernel as a covariance function.

Where the resources comprise online display advertising opportunities, the systems and methods described herein may advantageously be used to support a display advertisement booking system or other system configured to monetize forecasted online advertisement opportunities.

B. Example Display Advertising System

Figure 1:
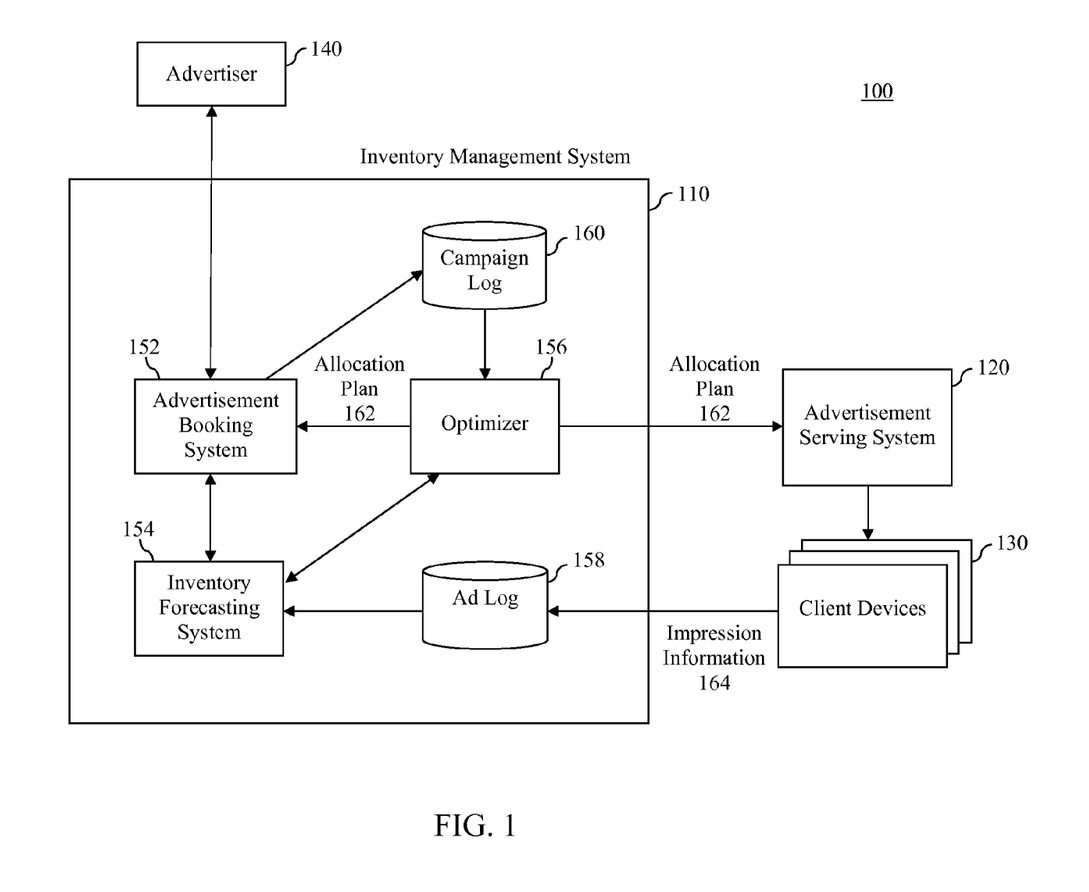
FIG. 1 is a block diagram of an online display advertising system in which an embodiment of the present invention may operate.

FIG. 1 is a block diagram of an example display advertising system 100 in which an embodiment of the present invention may operate. System 100 is presented herein by way of example only. Persons skilled in the relevant art(s) will appreciate that the utility of the systems and methods described herein for automatically forecasting the future availability of one or more resources is not limited to the context of display advertising systems. Rather, such systems and methods may advantageously be used to perform inventory forecasting in any system in which a supply of available resources is driven at least in part by the occurrence of one or more events.

As shown in FIG. 1, display advertisement system 100 includes an inventory management system 110, an advertisement serving system 120, and client devices 130. Inventory management system 110 is an automated system that is designed to enable advertisers 140 to purchase or reserve in advance display advertising opportunities that will arise when users of client devices 130 use such devices to view Web pages accessed via the Internet. Such purchasing or reserving in advance is also referred to herein as "booking." Advertisement serving system 120 is an automated system that is designed to serve display advertisements on behalf of such advertisers to the users of client devices 130 when such booked advertising opportunities arise. Client devices 130 are intended to broadly represent any electronic devices capable of accessing content via the Internet and may include, for example and without limitation, desktop computers, laptop computers, tablet computers, smart telephones, personal digital assistants, personal media devices, and the like.

In accordance with the system shown in FIG. 1, an advertiser, such as advertiser 140, interacts with inventory management system 110 to set up an advertising campaign, wherein part of setting up an advertising campaign includes booking certain advertising opportunities. Based on such booking activity, inventory management system 110 updates an allocation plan 162 that indicates which advertising opportunities have been booked by which campaigns and intermittently provides allocation plan 162 to advertisement serving system 120.

Advertisement serving system 120 utilizes the most recently-received version of allocation plan 162 to determine which display advertisements to serve when a Web page is delivered to a client device 130 that includes a particular advertising opportunity. In other words, advertisement serving system 120 determines which campaigns consume which advertising opportunities based on information provided in allocation plan 162. When a display advertisement is served, an impression is said to have occurred and information 164 about the impression is conveyed from the client device 130 upon which the impression occurred to inventory management system 110 for storage in an advertisement ("ad") log 158. Such impression information 164 includes an identification of the advertising campaign to which the impression was allocated. Information stored in ad log 158 is then used by inventory management system 110 to update allocation plan 162 to account for the consumption of certain advertising opportunities by certain advertising campaigns.

Although reference is made herein to interactions between advertisers, such as advertiser 140, and inventory management system 110, it is to be understood that other entities, including but not limited to agents acting on behalf of advertisers, may also interact with inventory management system 110 to set up advertising campaigns, query and book advertising opportunities, and the like.

To enable advertisers to book certain targeted advertising opportunities for their advertising campaigns and to forecast and track the consumption of such booked advertising opportunities by various advertising campaigns, display advertising system 100 characterizes each impression that is served using a predefined set of attributes and associated values. For example, the predefined set of attributes may include but are not limited to: a content topic (e.g., sports, news, finance) of a Web page on which the impression is served, a position of the impression on such Web page, a gender of a viewer of the impression, an age category of a viewer of the impression, a geographical location of a viewer of the impression, and a behavior tag that signifies certain behaviors or preferences of a viewer of the impression.

Thus, for example, an impression denoted IMP1 may be represented by at least the following set of <attribute, value> pairs: <Content Topic, Sports>, <Position, NREC>, <Gender, Male>, <Age Category, 2>, <Location, CA>, <Behavior Tag, Politics>. In accordance with this representation, advertisement impression IMP1 is served on a Web page having a content topic of sports, is served in a northern rectangle (NREC) position on the Web page, is served to a male user in an age category represented by the number 2, wherein the male user is geographically located in California (CA) and has shown a prior interest in content related to politics.

Inventory management system 110 will now be further described. As shown in FIG. 1, in addition to ad log 158 which was discussed above, inventory management system 110 further includes an advertisement booking system 152, an inventory forecasting system 154, an optimizer 156, and a campaign log 160. Each of these components will now be described.

Advertisement booking system 152 is configured to receive booking queries from advertisers, such as advertiser 140, that specify advertising opportunities in which the advertiser is interested. The queries specify target values for some or all of the attributes associated with the advertising opportunities they target. Thus, for example, with continued reference to the particular example <attribute, value> schema discussed above, an example query Q1 might be specified as follows:

Q1: Content Topic=Sports, Position=NREC, Location=CA

Here the target attributes are Content Topic, Position and Location, and each target attribute has a designated target value. In accordance with these target <attribute, value> pairs, query Q1 is seeking advertising opportunities in a northern rectangle position of Web pages having a content topic of sports and that will be served to a user located in California. Another example query Q2 might be specified as follows:

Q2: Content Topic=News, Position=EREC, Age Category=3

Here the target attributes are Content Topic, Position and Age Category, and each target attribute has a designated target value. In accordance with these target <attribute, value> pairs, query Q2 is seeking advertising opportunities in an eastern rectangle position of Web pages having a content topic of news and that will be served to a user within age category 3.

Advertisement booking system 152 interacts with inventory forecasting system 154 to obtain an estimate of how many advertising opportunities will be available in the future that match or otherwise qualify for a query. An impression matches or otherwise qualifies for a query when the values of its attributes satisfy the conditions specified by the query. Thus, for example, an advertising opportunity in the form of an unconsumed impression IMP1 may be specified as follows: <Content Topic, Sports>, <Position, NREC>, <Gender, Male>, <Age Category, 2>, <Location, CA>, <Behavior Tag, Politics>. It can be seen from this example that impression IMP1 matches query Q1 as described above, but does not match query Q2.

Booking queries are intended to determine the availability of as-yet-unconsumed impressions at some point in the future. Thus, the queries also include a duration attribute, the value of which specifies a time period over which the desired advertising opportunity will arise. Thus for example, a query may specify a target profile in accordance with Profile: Content Topic=Sports, Position=NREC, Location=CA as well as a target duration in accordance with Duration=Mar. 15, 2011-Mar. 31, 2011.

To process such a query, inventory management system 100 must be able to forecast the supply of advertising opportunities that will arise during the specified future time window. This function is performed by inventory forecasting system 154.

In particular, inventory forecasting system 154 utilizes historical information obtained from ad log 158 to model the future availability of various types of advertising opportunities. One example implementation of inventory forecasting system 154 is described in Section C below. Optimizer 156 operates to obtain a forecasted supply of advertising opportunities from inventory forecasting system 154 and allocates such forecasted supply among various existing advertising campaigns, information about which is stored in campaign log 160. In particular, optimizer 156 uses information about future supply obtained from inventory forecasting system 154 and booked demand obtained from campaign log 160 to update allocation plan 162. As noted above, allocation plan 162 is delivered to advertisement serving system 120 and is used thereby to drive the allocation of certain types of impressions to certain advertising campaigns.

As shown in FIG. 1, allocation plan 162 is also intermittently delivered to advertisement booking system 152. Advertisement booking system 152 uses the most recently-received allocation plan 162 to make decisions about booking new advertising campaigns. For example, advertisement booking system 152 may use allocation plan 162 along with forecasted supply information from inventory forecasting system 154 to determine whether a certain number of advertising opportunities are available to be booked by a new advertising campaign. If advertisement booking system 152 books a new advertising campaign, then advertisement booking system 152 will send information concerning the booking to campaign log 160 so that such information may be subsequently considered by optimizer 156 when generating an updated version of allocation plan 162.

C. Example Inventory Forecasting System

Figure 2:
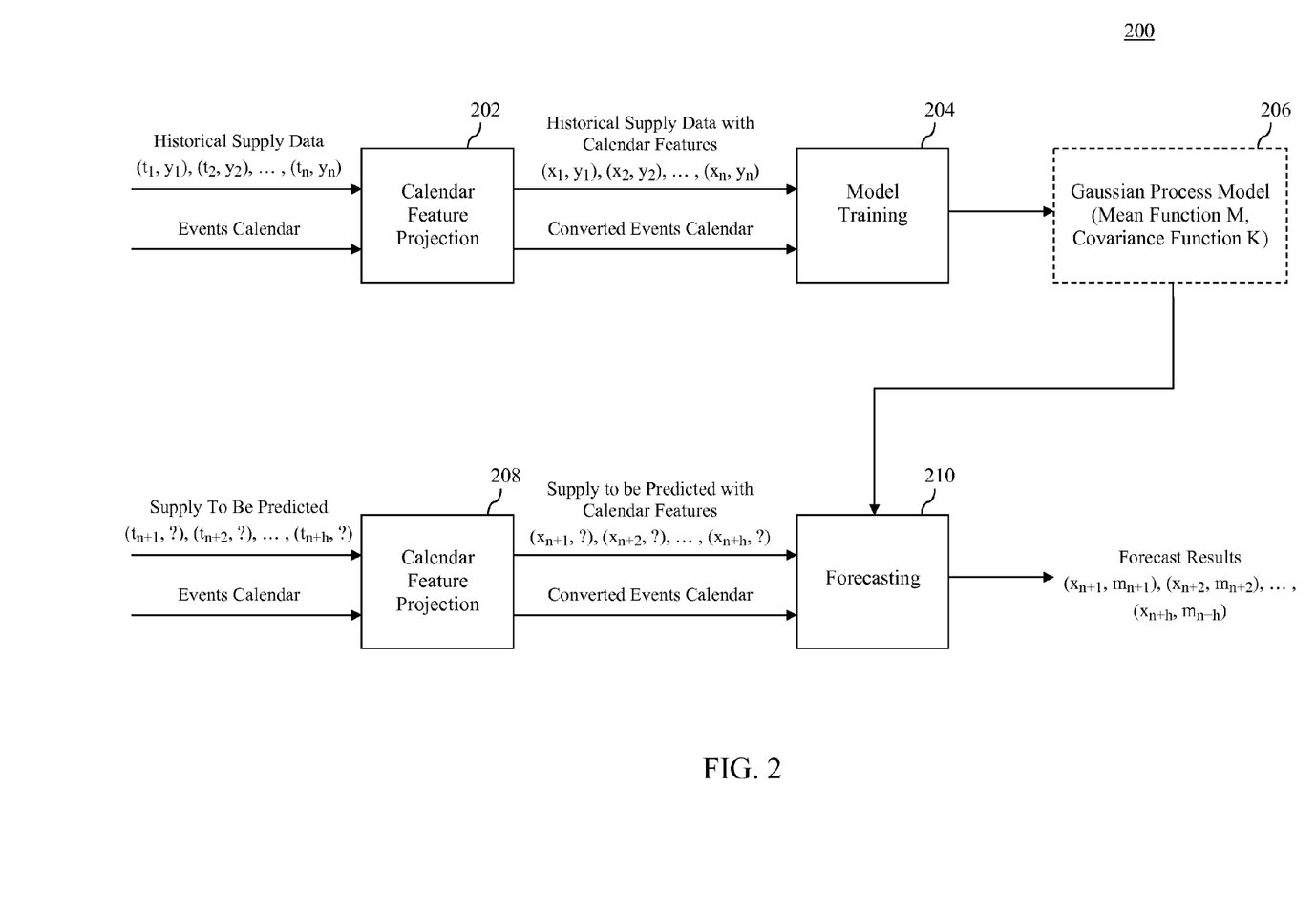
FIG. 2 is a block diagram of an inventory forecasting system in accordance with an embodiment of the present invention.

FIG. 2 is a block diagram of an example inventory forecasting system 200 in accordance with an embodiment of the present invention. As will be described in more detail herein, inventory forecasting system 200 is designed to forecast, or predict, a number of resources that will be available during one or more specified future time periods. Inventory forecasting system 200 may be used to implement, for example, inventory forecasting system 154 as described above in reference to display advertising system 100 of FIG. 1. However, inventory forecasting system 154 may also be used to forecast the availability of resources other than online display advertising opportunities, and thus may be used in contexts other than display advertising systems.

As shown in FIG. 2, inventory forecasting system 200 includes a first calendar feature projection module 202, a training module 204, a second calendar feature projection module 208, and a forecasting module 210. In one embodiment, each of these modules is implemented in software and is executed by one or more processor-based computer systems. In accordance with such an embodiment, each module may be executed by a different processor-based computer system, or two or more modules may be executed by the same processor-based computer system. Where software-implemented modules are executed by different processor-based computer systems, such computer systems may be communicatively connected and share information as necessary to implement the features of inventory forecasting system 200 as described herein. An example of a processor-based computer system that may be used to execute one or more of modules 202, 204, 208 and 210 when such modules are implemented in software is provided below in Section E. In alternate embodiments, modules 202, 204, 208, 210 may be implemented in firmware, in hardware, or in any sub-combination of software, firmware and hardware.

Generally speaking, inventory forecasting system 200 is designed to perform two main functions: (1) train a forecasting model; and (2) use the trained forecasting model to forecast an amount of resources available at some future point or points in time. As will be discussed below, the forecasting model used by inventory forecasting system 200 is designed to take into account the impact of past events on resource availability. As a result, forecasts generated by the model can reflect whether the time period(s) for which forecasting is requested will be impacted by like events occurring in the future. For example, in the context of an online display advertising system, historical supply data may indicate that the number of online display advertisements delivered via a sports-related Web page (e.g., YAHOO! Sports) increased substantially on past Super Bowl Sundays. Inventory forecasting system 200 can advantageously consider this history when forecasting the availability of online display advertising opportunities for a future time period that falls on a Super Bowl Sunday.

In inventory forecasting system 200, the inputs used to perform the training function include historical supply data and an events calendar. In an embodiment, the historical supply data specifies one or more past time periods in a series of time periods and a number of resources that were available during each of the one or more past time periods. In accordance with such an embodiment, each time period in the series of time periods may represent the same discrete amount of time. For example, each time period may represent a particular second, minute, hour, day, week or month in a series of corresponding seconds, minutes, hours, days, weeks or months, although these are only examples. As shown in FIG. 2, the historical supply data may be represented as a time series $(t_1, y_1), (t_2, y_2), \ldots, (t_n, y_n)$, wherein $t_1$-$t_n$ represents a series of time periods and $y_1$-$y_n$ represent a number of resources respectively available during such time periods. A time period may be represented, for example, using a time stamp. The historical supply data may reflect resource availability over some past period of time, e.g. over one or more prior months or years. The historical supply data may not be continuous; that is to say, supply data may be missing for one or more time periods in the series of time periods $t_1$-$t_n$.

In an embodiment in which inventory forecasting system 200 is used to implement a display advertisement system, such as display advertisement system 200 of FIG. 1, the historical supply data may be derived from information stored in an ad log, such as ad log 158. As described in Section B above, ad log 158 may store information concerning impressions (i.e., display advertisements delivered to users), wherein such information includes the time the impression occurred and a variety of attributes associated with the impression such as content topic, position, gender, age category, location, behavior tag and the like. In accordance with such an embodiment, the historical supply data may be derived by determining the number of impressions having a particular set of attributes that occurred during the time period represented by $t_1$-$t_n$. However, this is only an example, and the historical supply data may be obtained using other techniques as well.

The events calendar comprises information that indicates when one or more events have occurred in the past and also when like events will occur in the future. As used herein, the term "event" is intended to broadly encompass any phenomenon that can be associated with a particular time period or time periods. By way of example only, in the context of sports, an event may comprise a single sporting event such as the Super Bowl or an entire sports season, such as football season. In the context of holidays, an event may comprise a single holiday, such as Christmas or New Year's Day, or an entire holiday season. A wide variety of other events may be specified.

The events calendar may be provided as an input to inventory forecasting system 200 in a variety of ways, depending upon the implementation. In at least one embodiment, the events calendar comprises at least a portion of a configuration file that includes input parameters used for managing the execution of inventory forecasting system 200. In accordance with such an embodiment, the configuration file may be stored in a memory that is accessible to at least one of one or more processor-based computer systems upon which inventory forecasting system 200 is implemented. Still other methods may be used for providing the events calendar to inventory forecasting system 200.

In one embodiment, the events calendar comprises a list of known event types. In accordance with such an embodiment, the events calendar may be represented as follows:
    Event_Calendar:=List <event_type>
In further accordance with such an embodiment, each event_type in the list may include a list of similar events occurring in the past or in the future. This can be represented as:
    event_type:=List <event>,
wherein each event specifies a particular time period or range of time periods during which the event occurred. Thus, by way of example, an event_type "Stanley Cup Playoffs" might include the following events represented as distinct date ranges: Apr. 9, 2008-Jun. 4, 2008, Apr. 15, 2009-Jun. 12, 2009, Apr. 14, 2010-Jun. 9, 2010, Apr. 13, 2011-Jun. 17, 2011 and Apr. 11, 2012-Jun. 8, 2012. In certain embodiments, each event is defined by a start time stamp and an end time stamp. The format of the time stamp may be implementation-specific and may depend to some extent on the granularity of the time periods used for historical signal modeling and forecasting.

In the embodiment shown in FIG. 2, the historical supply data and events calendar are processed by first calendar feature projection module 202 before being used for training by training module 204. First calendar feature projection module 202 is configured to determine certain calendar features for each time period specified in the historical supply data and to provide such features to training module 204 along with the original historical supply data. For example, for a given time period $t_1$ associated with historical supply sample $(t_1, y_1)$, first calendar feature projection module 202 may generate feature information that specifies a day of the week that $t_1$ fell on (e.g., Saturday), a day of the year $t_1$ fell on (e.g., the $43^{rd}$ day of the year), or the like. Such calendar features can subsequently be used by the forecasting model to determine a distance between different time periods in a variety of ways beyond simply measuring distance in time. In certain implementations, first calendar feature projection module 202 combines the calendar features associated with a particular time period with the time period itself to create a multi-dimensional calendar feature vector. In FIG. 2, the calendar feature vector generated for the time period $t_1$ is represented as $x_1$. Thus, first calendar feature projection module 202 receives the historical supply data $(t_1, y_1), (t_2, y_2), \ldots, (t_n, y_n)$ and outputs to training module 204 the historical supply data with calendar features $(x_1, y_1), (x_2, y_2), \ldots, (x_n, y_n)$.

First calendar feature projection module 202 is further configured to convert the time period information used to define event durations in the events calendar into the same multi-dimensional feature space used to define the historical supply data with calendar features. This enables the forecasting model to measure distances between time periods associated with the historical supply data and time periods associated with events using the same feature set. As shown in FIG. 2, after performing this conversion function, first calendar feature projection module 202 outputs a converted events calendar to training module 204.

It is noted that in alternate embodiments, calendar feature projection is not performed at all, in which case the historical supply data $(t_1, y_1), (t_2, y_2), \ldots, (t_n, y_n)$ and the events calendar may be input directly to training module 204.

Training module 204 is configured to train a forecasting model based on the historical supply data with calendar features and the converted events calendar received from first calendar feature projection module 202. In one embodiment, the forecasting model comprises a non-parametric forecasting model. In further accordance with such an embodiment, the non-parametric forecasting model comprises a Gaussian Process model having a linear mean function and an event-driven kernel as a covariance function. A Gaussian process model is particularly well-suited for characterizing diversity of signal shapes and the non-stationary behavior patterns driven by events. As a kernel machine, a Gaussian Process model also provides a flexible and extensible framework for embedding domain knowledge, such as calendar information, into forecasting.

As will be appreciated by persons skilled in the relevant art(s), Gaussian Process is a kernel machine and a prediction for a particular point depends primarily on the neighborhood of this point. The proximity of the points is defined by the kernel function. A well-known version of the Gaussian Kernel will determine that two points that are distant in time are not correlated. For event-driven resource availability, this assumption is not correct. For instance, in the context of display advertising opportunities on a sports-related Web page, it is reasonable to expect that supply trends exhibited during the football season in 2010 would be similar to supply trends exhibited during the football season in 2009: both have a similar regular season period, a playoff season period, and important dates (opening game, playoff games, Super Bowl, etc.). To address this issue, an embodiment defines the kernel as a combination of a traditional Gaussian kernel that depends on the time difference that is multiplicatively modified by the proximity to similar calendar events.

For example, in accordance with one embodiment, the Gaussian kernel is defined as:

$$k(x_i, x_j) = \sigma_f^2 \exp\left(-\frac{1}{2l^2}\|x_i - x_j\|^2 - \frac{1}{2h^2}\alpha_{e^*}(d(x_i, e^*) - d(x_j, e^*))^2\right) + \sigma_s^2 \delta_{x_i x_j}$$

where $$e^* = \operatorname*{argmin}_{e \in E}[d(x_i, e) + d(x_j, e)].$$

In accordance with this kernel definition, $x_i$ and $x_j$ comprise calendar feature vectors associated with the historical supply samples $(x_i, y_i)$ and $(x_j, y_j)$, respectively. The parameter $\sigma_f^2$ comprises a signal variance, the parameter l comprises a length scaling parameter, and the parameter $\sigma_s^2$ comprises a noise variance. These parameters are often referred to by persons skilled in the relevant art(s) as hyper parameters and can be learned, for example, by performing a log-likelihood maximization using a Limited memory Broyden-Fletcher-Goldfarb-Shanno (L-BFGS) algorithm. The parameter $\delta_{x_i x_j}$ comprises the well-known Kronecker delta function which is equal to 1 when $x_i = x_j$ and is equal to 0 when $x_i \neq x_j$.

In further accordance with the foregoing kernel definition, E comprises the converted events calendar that includes a list of event types, d(.) is a distance function that defines a de-correlation level between a calendar feature vector associated with a historical supply sample and a calendar feature vector associated with an event type, h comprises an event scaling parameter, and $\alpha_{e^*} > 0$ comprises a weight characterizing a duration of event type $e^*$ in the list of events.

As can be seen from the foregoing, the event type $e^*$ is defined as the event type e within converted events calendar E for which the sum of the distance between the event type e and the calendar feature vector $x_i$ and the distance between the event type e and the calendar feature vector $x_j$ is minimized. The distance between a calendar feature vector $x_i$ or $x_j$ and an event type is the minimum of the distance between the calendar feature vector $x_i$ or $x_j$ and each event defined within the particular event type. Thus, for example, time periods falling within two different years may both be deemed very close to a "Super Bowl" event type if each time period is close to a Super Bowl date within its respective year. In one embodiment, each event within a given event type is represented by a single calendar feature vector to facilitate the calculation of a distance between each event type and each of calendar features vectors $x_i$ and $x_j$.

In accordance with the foregoing kernel definition, the degree of correlation between $x_i$ and $x_j$ will decrease as the difference between their respective distances from event type $e^*$ increases. Consequently, in an instance where a given $x_i$ and $x_j$ are both determined to be similarly close to an event type $e^*$, the correlation between $x_i$ and $x_j$ will be greater than an instance where one of $x_i$ and $x_j$ is determined to much closer to the event type $e^*$ than the other. Thus, the kernel can be seen to factor closeness to events into determining the correlation between points.

In accordance with one embodiment, the foregoing kernel $k(x_1, x_2)$ is applied to every combination of historical supply samples $(x_1, y_1), (x_2, y_2), \ldots, (x_n, y_n)$ to generate a covariance matrix K, which comprises an n×n matrix. The covariance matrix K is then used to define a mean function M. For example the covariance matrix K may be used to define a mean function with zero mean, which is defined as:

$$M(x^*) = k(x^*)^T K^{-1} y$$

wherein $x^*$ is a calendar feature vector associated with a time period for which forecasting is to be performed, $k(x^*) = [k(x_1, x^*), k(x_2, x^*), \ldots, k(x_n, x^*)]$ and $y = [y_1, y_2, \ldots, y_n]$. It is noted that other types of mean functions can also be used, such as a function with a constant mean, with a linear or non-linear trend, and so on. The best mean function may usually be determined based on the nature of the signal. The Covariance matrix K and the mean function M fully define the Gaussian process model.

It is noted that in an embodiment in which calendar feature projection is not used, the above-described kernel definition may be replaced with:

$$k(t_i, t_j) = \sigma_f^2 \exp\left(-\frac{1}{2l^2}(t_i - t_j)^2 - \frac{1}{2h^2}\alpha_{e^*}(d(t_i, e^*) - d(t_j, e^*))^2\right) + \sigma_s^2 \delta_{t_i t_j}$$

where $$e^* = \operatorname*{argmin}_{e \in E}[d(x_i, e) + d(x_j, e)].$$

As can be seen, in this kernel the calendar feature vectors $x_i$ and $x_j$ have been replaced with the time periods $t_i$ and $t_j$. This is the equivalent to defining the calendar feature vectors $x_i$ and $x_j$ as have a single dimension only, which is a time period.

The forecasting functionality of inventory forecasting system 200 will now be described. The inputs to the forecasting function include a supply to be predicted and the aforementioned events calendar. In an embodiment, the supply to be predicted specifies one or more future time periods for which forecasting is to be performed, wherein the future time period(s) are part of the same series of time periods specified in the historical supply data and wherein each future time period represents the same discrete amount of time represented by each time period specified in the historical supply data. As shown in FIG. 2, the supply to be predicted may be represented as a time series $(t_{n+1}, ?), (t_{n+2}, ?), \ldots, (t_{n+h}, ?)$, wherein $t_{n+1}$-$t_{n+h}$ represents the future time periods for which supply forecasts are desired. In an embodiment in which inventory forecasting system 200 is used to implement a display advertisement system, such as display advertisement system 200 of FIG. 1, the specified future time periods for which forecasting is desired may be received from an advertisement booking system, such as advertisement booking system 152.

In the embodiment shown in FIG. 2, the specified future time periods and events calendar are processed by second calendar feature projection module 208 before being used for forecasting by forecasting module 210. Second calendar feature projection module 208 is configured to generate the same types of calendar features for each specified future time period as were generated by first calendar feature projection module 202 for the time periods specified in the historical supply data. Second calendar feature projection module 208 is further configured to provide such features to forecasting module 210 along with the specified future time periods. In certain implementations, second calendar feature projection module 208 combines the calendar features associated with a particular future time period with the future time period itself to create a multi-dimensional calendar feature vector. In FIG. 2, the calendar feature vector generated for the time period $t_{n+1}$ is represented as $x_{n+1}$. Thus, second calendar feature projection module 208 receives the supply to be predicted $(t_{n+1}, ?), (t_{+2}, ?), \ldots, (t_{n+h}, ?)$ and outputs to forecasting module 210 the supply to be predicted with calendar features $(x_{n+1}, ?), (x_{n+2}, ?), \ldots, (x_{n+h}, ?)$.

Second calendar feature projection module 208 is further configured to convert the time period information used to define event durations in the events calendar into the same multi-dimensional feature space used to define the historical supply data with calendar features. As shown in FIG. 2, after performing this conversion function, second calendar feature projection module 208 outputs a converted events calendar to forecasting module 210.

It is noted that in alternate embodiments, calendar feature projection is not performed at all, in which case the supply to be predicted $(t_{n+1}, ?), (t_{n+2}, ?), \ldots, (t_{n+3}, ?)$ and the events calendar may be input directly to forecasting module 210.

Forecasting module 210 is configured to apply a forecasting model 206 trained by training module 204 to generate a forecasted number of resources for each of the future time periods $t_{n+1}, t_{n+2}, \ldots, t_{n+h}$. The forecasted number of resources for future time periods $t_{n+1}, t_{n+2}, \ldots, t_{n+h}$ are shown in FIG. 2 as $m_{n+1}, m_{n+2}, \ldots, m_{n+h}$, respectively.

In accordance with embodiments previously described herein, applying forecasting model 206 comprises applying a non-parametric forecasting model. In further accordance with such an embodiment, the non-parametric forecasting model comprises a Gaussian Process model having a linear mean function and an event-driven kernel as a covariance function such as that previously described in reference to training module 204. Thus, for example, in one embodiment, the predicted supply for a future time period x* is obtained by applying the previously-referenced zero mean function M, defined as:

$$M(x^*) = k(x^*)^T K^{-1} y$$

wherein x is a calendar feature vector associated with the future time period for which forecasting is to be performed, K is the n×n covariance matrix described above in reference to training module 204, $k(x^*) = [k(x_1, x^*), k(x_2, x^*), \ldots, k(x_n, x^*)]$ wherein and $y = [y_1, y_2, \ldots, y_n]$. The kernels $k(x_1, x^*), k(x_2, x^*), \ldots, k(x_n, x^*)$ may be calculated in accordance with the kernel $k(x_i, x_j)$ described above in reference to training module 204. As noted above, however, different mean functions may be used depending upon the implementation.

By applying the trained Gaussian Process model in this manner, an inventory forecast may be generated for the specified future time periods that takes into account the proximity of the future time periods to future events specified in the converted events calendar and the correlation between such events and like past events also included in the events calendar.

In accordance with an embodiment in which inventory forecasting system 200 comprises a system used to implement a display advertising system, such as display advertising system 100 of FIG. 1, the forecast results produced by forecasting module may be provided to an advertisement booking system, such as advertisement booking system 152. The advertisement booking system may use such forecasted results to respond to a query concerning future available online advertising opportunities or the like.

D. Example Event-Driven Inventory Forecasting Method

Figure 3:
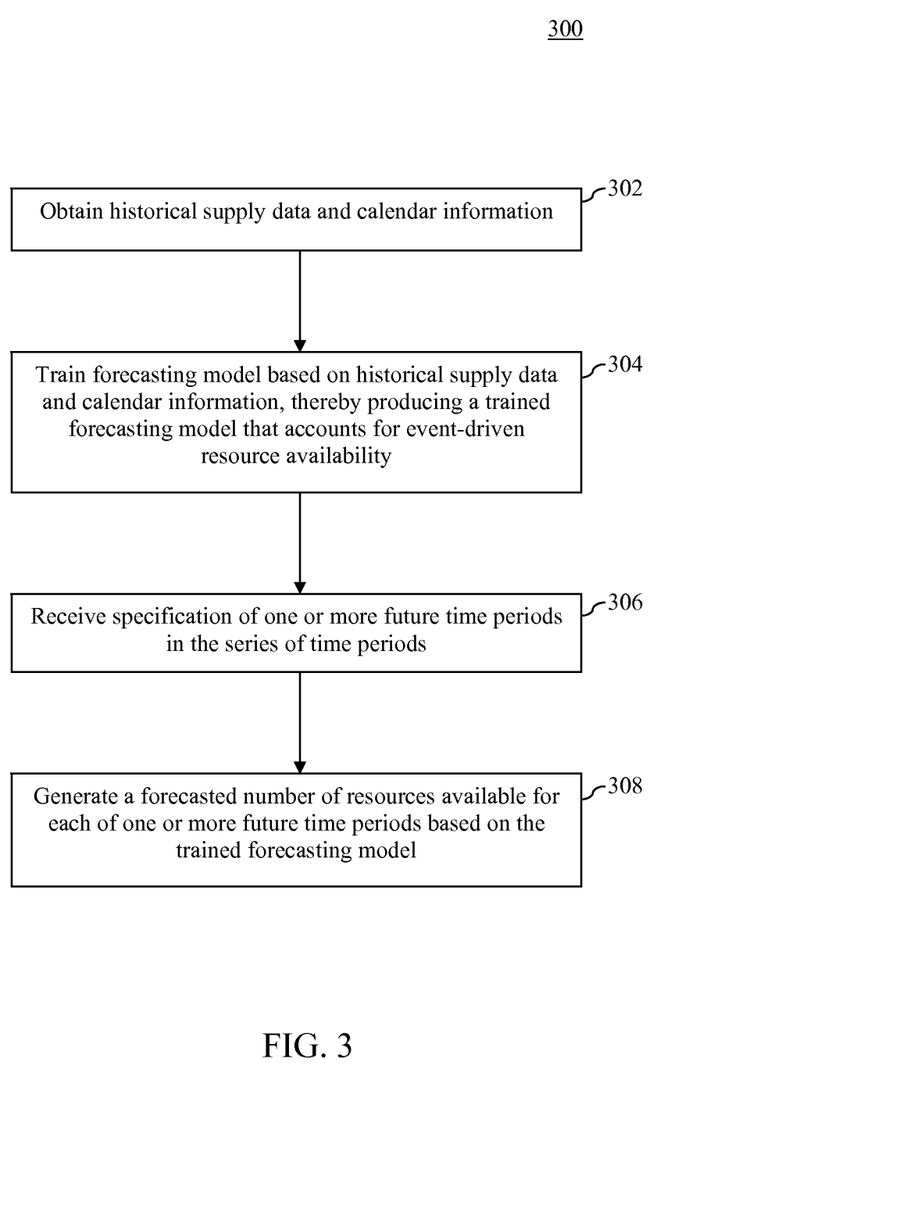
FIG. 3 depicts a flowchart of a method for forecasting an availability of resources in accordance with an embodiment

FIG. 3 depicts a flowchart 300 of a method for forecasting an availability of resources in accordance with an embodiment. The resources may comprise, for example, online display advertising opportunities although this example is not intended to be limiting. For the sake of illustration, the method of flowchart 300 will now be described in reference to example inventory forecasting system 200 of FIG. 2. However, persons skilled in the relevant art(s) will appreciate that the method of flowchart 300 may be implemented by systems other than system 200.

As shown in FIG. 3, the method of flowchart 300 begins at step 302, in which historical supply data and calendar information is obtained. The historical supply data may specify one or more past time periods in a series of time periods and a number of resources that were available during each of the one or more past time periods. The calendar information may identify one or more events and, for each event, one or more corresponding time periods in the series of time periods during which the event occurs. Step 302 may be performed, for example, by training module 204 of inventory forecasting system 200. In certain embodiments, the historical supply data may comprise historical supply data with calendar features such as that generated by first calendar feature projection module 202 and the calendar information may comprise the converted event calendar produced by first calendar feature projection module 202. In alternate embodiments, the historical supply data and calendar information does not include calendar features.

At step 304, a forecasting model is trained based on the historical supply data and calendar information obtained during step 302, thereby producing a trained forecasting model that accounts for event-driven resource availability. Step 304 may be performed, for example, by training module 204 of inventory forecasting system 200. In accordance with at least one embodiment, step 304 comprises training a non-parametric forecasting model. In further accordance with such an embodiment, training the non-parametric forecasting model comprises training a Gaussian process model having a linear mean trend and an event-driven kernel as a covariance function. The kernel may be the kernel function $k(x_i, x_j)$ described above in reference to inventory forecasting system 200.

At step 306, a specification of one or more future time periods in the series of time periods is received. Step 306 may be performed, for example, by forecasting module 210 of inventory forecasting system 200. In certain embodiments, the specified future time periods may be received along with calendar features as generated by second calendar feature projection module 208. Step 306 may further comprise receiving the same calendar information described above in reference to step 302.

In certain embodiments, step 306 may comprise receiving the specification of the one or more future time periods in the series of time periods from an advertisement booking system, such as advertisement booking system 152 of display advertising system 100 as described above in reference to FIG. 1.

At step 308, a forecasted number of resources available for each of the one or more future time periods is generated based on the trained forecasting model. Step 308 may be performed, for example, by forecasting module 210 of inventory forecasting system 200 in a manner such as described above in reference to FIG. 2. In accordance with certain embodiments, the method of flowchart 300 may further include providing the forecasted number of resources available for each of the one or more future time periods to an advertisement booking system, such as advertisement booking system 152 of display advertising system 100 as described above in reference to FIG. 1.

E. Example Computer System Implementation

Display advertising system 100, inventory forecasting system 200, and any of the sub-systems or components contained therein may be implemented in hardware, software, firmware, or any combination thereof. For example, display advertising system 100, inventory forecasting system 200, and any of the sub-systems or components contained therein may be implemented as computer program code configured to be executed in one or more processors. Alternatively, display advertising system 100, inventory forecasting system 200, and any of the sub-systems or components contained therein may be implemented as hardware logic/electrical circuitry.

Figure 4:
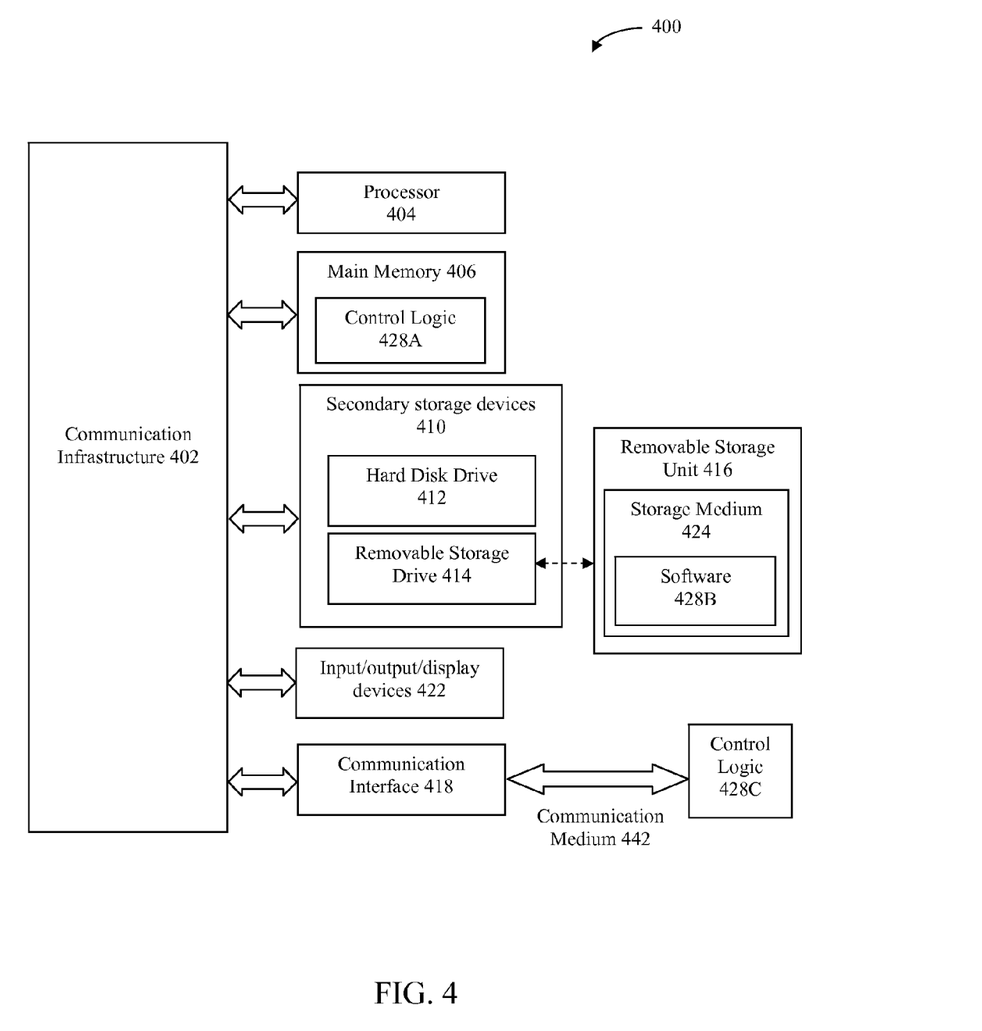
FIG. 4 is a block diagram of a computer system that may be used to implement one or more aspects of the present invention.

The embodiments described herein, including systems, methods/processes, and/or apparatuses, may be implemented using well known servers/computers, such as a computer 400 shown in FIG. 4. For example, display advertising system 100, inventory forecasting system 200, and any of the sub-systems or components contained therein may be implemented using one or more computers 400.

Computer 400 can be any commercially available and well known computer capable of performing the functions described herein, such as computers available from International Business Machines, Apple, Sun, HP, Dell, Cray, etc. Computer 1500 may be any type of computer, including a desktop computer, a server, etc.

Computer 400 includes one or more processors (also called central processing units, or CPUs), such as a processor 404. Processor 404 is connected to a communication infrastructure 402, such as a communication bus. In some embodiments, processor 404 can simultaneously operate multiple computing threads.

Computer 400 also includes a primary or main memory 406, such as random access memory (RAM). Main memory 406 has stored therein control logic 428A (computer software), and data.

Computer 400 also includes one or more secondary storage devices 410. Secondary storage devices 410 include, for example, a hard disk drive 412 and/or a removable storage device or drive 414, as well as other types of storage devices, such as memory cards and memory sticks. For instance, computer 400 may include an industry standard interface, such a universal serial bus (USB) interface for interfacing with devices such as a memory stick. Removable storage drive 414 represents a floppy disk drive, a magnetic tape drive, a compact disk drive, an optical storage device, tape backup, etc.

Removable storage drive 414 interacts with a removable storage unit 416. Removable storage unit 416 includes a computer useable or readable storage medium 424 having stored therein computer software 428B (control logic) and/or data. Removable storage unit 416 represents a floppy disk, magnetic tape, compact disk, DVD, optical storage disk, or any other computer data storage device. Removable storage drive 414 reads from and/or writes to removable storage unit 416 in a well known manner.

Computer 400 also includes input/output/display devices 422, such as monitors, keyboards, pointing devices, etc.

Computer 400 further includes a communication or network interface 418. Communication interface 418 enables computer 400 to communicate with remote devices. For example, communication interface 418 allows computer 400 to communicate over communication networks or mediums 442 (representing a form of a computer useable or readable medium), such as LANs, WANs, the Internet, etc. Network interface 418 may interface with remote sites or networks via wired or wireless connections.

Control logic 428C may be transmitted to and from computer 400 via the communication medium 442.

Any apparatus or manufacture comprising a computer useable or readable medium having control logic (software) stored therein is referred to herein as a computer program product or program storage device. This includes, but is not limited to, computer 400, main memory 406, secondary storage devices 410, and removable storage unit 416. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may store program modules that include computer program logic for implementing the features of display advertising system 100, inventory forecasting system 200, and any of the sub-systems or components contained therein, any of the steps of flowchart 300 of FIG. 3, and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

F. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for forecasting an availability of resources, comprising:
   training, by a processor, a non-parametric forecasting model based both on historical supply data and calendar information,
   wherein the historical supply data specifies one or more past time periods in a series of time periods and a number of resources that were available during each of the one or more past time periods,
   wherein the calendar information identifies one or more events and, for each event, one or more corresponding time periods in the series of time periods during which the event occurs, thereby producing a trained forecasting model that accounts for event-driven resource availability, wherein the training of the non-parametric forecasting model includes training of a Gaussian process model, wherein the training of the Gaussian process model includes training a Gaussian model with an event-driven kernel as a covariance, and wherein the event-driven kernel includes a distance function that defines a de-correlation level between a calendar feature vector associated with the historical supply data and a calendar feature vector associated with an event type.

receiving, at the processor, a specification of one or more future time periods in the series of time periods; and generating, by the processor, a forecasted number of resources available for each of the one or more future time periods based on the trained non-parametric forecasting model.

2. The method of claim 1, wherein the resources comprise online display advertising opportunities.

3. The method of claim 2, wherein receiving the specification of the one or more future time periods in the series of time periods comprises receiving the specification of the one or more future time periods in the series of time periods from an advertisement booking system, the method further comprising: providing the forecasted number of resources available for each of the one or more future time periods to the advertisement booking system.

4. The method of claim 1, wherein the event-driven kernel is defined as:

$$k(x_i, x_j) =$$
$$\sigma_f^2 \exp\left(-\frac{1}{2l^2}\|x_i - x_j\|^2 - \frac{1}{2h^2}\alpha_{e^*}(d(x_i, e^*) - d(x_j, e^*))^2\right) + \sigma_s^2 \delta_{x_i x_j}$$

where $$e^* = \underset{e \in E}{\operatorname{argmin}}[d(x_i, e) + d(x_j, e)],$$

wherein $x_i$ and $x_j$ comprise calendar feature vectors associated with time periods within the series or time periods, $\sigma_f^2$ comprises a signal variance, 1 comprises a length scaling parameter, h comprises an event scaling parameter, $\sigma_s^2$ comprises a noise variance, $\delta_{x_i x_j}$, comprises a Kronecker delta function, E comprises a list of events, d(.) is a distance function that defines a de-correlation level between a calendar feature vector and an event in the list of events, and $\alpha_e' > 0$ comprises a weight associated with event e* in the list of events.

5. The method of claim 1, further comprising:
generating calendar features for each of the one or more past time periods specified by the historical supply data and for at least one of the one or more time periods identified for each event; and
training the forecasting model based also on the generated calendar features.

6. The method of claim 2, wherein receiving the specification of the one or more future time periods in the series of time periods comprises receiving the specification of the one or more future time periods in the series of time periods from a system configured to monetize forecasted online advertising opportunities, the method further comprising: providing the forecasted number of resources available for each of the one or more future time periods to the system configured to monetize forecasted online advertising opportunities.

7. The method of claim 2, further comprising using, by the processor, the forecasted number to support a display advertisement booking system.

8. The method of claim 2, further comprising using, by the processor, the forecasted number to support a system configured to monetize forecasted online advertising opportunities.

9. An inventory forecasting system, comprising:
a software-implemented training module executing on one or more processor-based computer systems that trains a non-parametric forecasting model based both on historical supply data and calendar information, the historical supply data specifying one or more past time periods in a series of time periods and a number of resources that were available during each of the one or more past time periods, the calendar information identifying one or more events and, for each event, one or more corresponding time periods in the series of time periods during which the event occurs, thereby producing a trained non-parametric forecasting model that accounts for event-driven resource availability, wherein the software implement training module trains non-parametric forecasting model by training a Gaussian process model with an event-driven kernel as a covariance, and wherein a definition of the event driven kernel includes a distance function that defines a de-correlation level between a calendar feature vector associated with the historical supply data and a calendar feature vector associated with an event type; and
a software-implemented forecasting module executing on the one or more processor-based computer systems that receives a specification of one or more future time periods in the series of time periods and generates a forecasted number of resources available for each of the one or more future time periods based on the trained non-parametric forecasting model.

10. The system of claim 9, wherein the resources comprise online display advertising opportunities.

11. The system of claim 10, further comprising a software-implemented advertisement booking system executing on the one or more processor-based computer systems that provides the specification of the one or more future time periods in the series of time periods to the forecasting module and that receives the forecasted number of resources available for each of the one or more future time periods from the forecasting module.

12. The system of claim 9, wherein the event-driven kernel is defined in accordance with:

$$k(x_i, x_j) =$$
$$\sigma_f^2 \exp\left(-\frac{1}{2l^2}\|x_i - x_j\|^2 - \frac{1}{2h^2}\alpha_{e^*}(d(x_i, e^*) - d(x_j, e^*))^2\right) + \sigma_s^2 \delta_{x_i x_j}$$

where $$e^* = \underset{e \in E}{\operatorname{argmin}}[d(x_i, e) + d(x_j, e)],$$

wherein $x_i$ and $x_j$ comprise calendar feature vectors associated with time periods within the series or time periods, $\sigma_f^2$ comprises a signal variance, 1 comprises a length scaling parameter, h comprises an event scaling parameter, $\sigma_s^2$ comprises a noise variance, $\delta_{x_i x_j}$, comprises a Kronecker delta function, E comprises a list of events, d(.) is a distance function that defines a de-correlation level between a calendar feature vector and an event in the list of events, and $\alpha_e' > 0$ comprises a weight associated with event e* in the list of events.

13. The system of claim 9, further comprising: a software-implemented calendar feature projection module executing on the one or more processor-based computer systems that generates calendar features for each of the one or more past time periods specified by the historical supply data and for at least one of the one or more time periods identified for each event, wherein the model training module trains the forecasting model based also on the generated calendar features.

14. The system of claim 10, further comprising a software-implemented system configured to monetize forecasted online advertising opportunities executing on the one or more processor-based computer systems that provides the specification of the one or more future time periods in the series of time periods to the forecasting module and that receives the forecasted number of resources available for each of the one or more future time periods from the forecasting module.

15. The system of claim 10, further comprising a software-implemented module executing on one or more processor-based computer systems that use the forecasted number to support a display advertisement booking system.

16. The system of claim 10, further comprising a software-implemented module executing on one or more processor-based computer systems that the forecasted number to support a system configured to monetize forecasted online advertising opportunities.

17. A computer program product comprising a non-transitory computer-readable storage medium having computer program logic recorded thereon for enabling a processing unit to forecast an availability of resources, the computer program logic comprising:

first computer program logic that is executable by the processing unit to receive a specification of one or more future time periods in a series of time periods; and second computer program logic that is executable by the processing unit to generate a forecasted number of resources available for each of the one or more future time periods based on a non-parametric forecasting model, wherein the non-parametric forecasting model is trained based both on historical supply data and calendar information, the historical supply data specifying one or more past time periods in the series of time periods and a number of resources that were available during each of the one or more past time periods and the calendar information identifying one or more events and, for each event, one or more corresponding time periods in the series of time periods during which the event occurs, and wherein the non-parametric forecasting model is trained using a Gaussian Process Model with an event-driven kernel as a covariance and the event driven kernel includes a distance function that defines a de-correlation level between a calendar feature vector associated with the historical supply data and a calendar feature vector associated with an event type.

18. The computer program product of claim 17, wherein the event-driven kernel is defined as:

$$k(x_i, x_j) = \sigma_f^2 \exp\left(-\frac{1}{2l^2}\|x_i - x_j\|^2 - \frac{1}{2h^2}\alpha_{e^*}(d(x_i, e^*) - d(x_j, e^*))^2\right) + \sigma_s^2 \delta_{x_i x_j}$$

where $$e^* = \underset{e \in E}{\operatorname{argmin}}[d(x_i, e) + d(x_j, e)],$$

wherein $x_i$ and $x_j$ comprise calendar feature vectors associated with time periods within the series or time periods, $\sigma_f^2$ comprises a signal variance, 1 comprises a length scaling parameter, h comprises an event scaling parameter, $\sigma_s^2$ comprises a noise variance, $\delta_{xixj}$, comprises a Kronecker delta function, E comprises a list of events, d(.) is a distance function that defines a de-correlation level between a calendar feature vector and an event in the list of events, and $\alpha_e' > 0$ comprises a weight associated with event e* in the list of events.

19. The computer program product of claim 17, wherein the resources comprise online display advertising opportunities.

20. The computer program product of claim 19, wherein the computer program logic further comprises third computer program logic that is executable by the processing unit to use the forecasted number to support a display advertisement booking system.

* * * * *